United States Patent
Louzir et al.

(10) Patent No.: US 10,867,227 B2
(45) Date of Patent: Dec. 15, 2020

(54) METHOD AND APPARATUS FOR PASSIVE REMOTE CONTROL

(71) Applicant: INTERDIGITAL CE PATENT HOLDINGS, Paris (FR)

(72) Inventors: Ali Louzir, Rennes (FR); Rupesh Kumar, Rennes (FR); Pascal Nadeau, Cesson Sevigne (FR); Philippe Minard, Saint Medard sur Ille (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/464,258

(22) PCT Filed: Nov. 21, 2017

(86) PCT No.: PCT/EP2017/079936
§ 371 (c)(1),
(2) Date: May 24, 2019

(87) PCT Pub. No.: WO2018/095911
PCT Pub. Date: May 31, 2018

(65) Prior Publication Data
US 2019/0392274 A1  Dec. 26, 2019

(30) Foreign Application Priority Data
Nov. 25, 2016  (EP) ..................... 16306557

(51) Int. Cl.
G06K 19/07  (2006.01)
G06K 7/10   (2006.01)
H04B 5/00   (2006.01)

(52) U.S. Cl.
CPC ..... *G06K 19/0701* (2013.01); *G06K 7/10366* (2013.01); *G06K 19/0723* (2013.01); *H04B 5/0062* (2013.01)

(58) Field of Classification Search
CPC .......... G06K 19/0701; G06K 19/0723; G06K 7/10366; G06K 7/0008; G06K 19/0716; H04B 5/0062
See application file for complete search history.

(56) References Cited

U.S. PATENT DOCUMENTS

| | | |
|---|---|---|
| 2005/0163063 A1 | 7/2005 | Kuchler |
| 2006/0038738 A1* | 2/2006 | Shtrom ................. H01Q 1/243 343/876 |
| 2006/0152366 A1 | 7/2006 | Sironi |
| 2007/0057790 A1 | 3/2007 | Alden |
| 2010/0079289 A1 | 4/2010 | Brandt et al. |
| 2010/0190436 A1 | 7/2010 | Cook |

(Continued)

*Primary Examiner* — Ryan W Sherwin
(74) *Attorney, Agent, or Firm* — Volpe Koenig

(57) ABSTRACT

Apparatus (300, 400) and method (600) for passive remote control are provided. The apparatus (300) includes at least two radio-frequency identification (RFID) tag devices (330_1, 330_2, 330_N, 430_1, 430_2) each operable to transmit a signal when activated and a first switch coupled to the at least two RFID tag devices (310_1, 310_2, 310_K, 410_1) and operable to activate the at least two RFID tag devices when the first switch is in a first switch state, said first switch being a first key identified by RFID tag information of the at least two RFID tag devices. Apparatus (110) and method (700) for receiving RFID signals are also provided.

20 Claims, 6 Drawing Sheets

(56) References Cited

U.S. PATENT DOCUMENTS

2011/0285534 A1\* 11/2011 Seo ................... G05B 19/042
  340/572.1
2013/0127599 A1   5/2013 Foster
2014/0176307 A1\* 6/2014 Forster ............. G06K 19/07345
  340/10.4

\* cited by examiner

METHOD AND APPARATUS FOR PASSIVE REMOTE CONTROL

This application claims the benefit under 35 U.S.C. § 365 of International Application PCT/EP2017/079936, filed Nov. 21, 2017, which was published in accordance with PCT Article 21(2) on May 31, 2018, in English, and which claims the benefit of European Patent Application No. 16306557.6, filed on Nov. 25, 2016.

TECHNICAL FIELD

The present disclosure relates to passive or semi-passive devices, in particular, radio frequency identification (RFID) devices.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Radio frequency identification (RFID) is a generic term for technologies that use radio waves to automatically identify people or objects. An RFID system uses tags, or labels attached to the objects to be identified. Two-way radio transmitter-receivers called interrogators or readers send a signal to the tag and read its response. There are several types of RFID tags, depending on range, size, cost and underlying technology.

RFID tags may be passive, active or battery-assisted (or semi) passive. An active tag has an on-board battery and periodically transmits its ID signal. A battery-assisted passive (BAP) tag has a small battery on board and is activated when in the presence of an RFID reader. A passive tag may be cheaper and smaller because it has no battery; instead, the tag uses the radio energy transmitted by the reader as the power source. However, to operate a passive tag, it may have to be illuminated with a power level roughly a thousand times stronger than for signal transmission. That makes a difference in interference and in exposure to radiation. The energy conversion may be performed by an RF energy harvester generally including an antenna and a rectifier/multiplier tuned to the waves received from the RFID reader.

Tags may either be read-only, having a factory-assigned serial number that may be used as a key, password or index into a database, or may be read/write, where object-specific data can be written into the tag by the system user. Field programmable tags may be write-once, read-multiple; "blank" tags may be written with an electronic product code by the user.

RFID tags may contain at least two parts: an integrated circuit (IC, microchip or chip) for storing and processing information, modulating and demodulating a radio-frequency (RF) signal, collecting DC power from the incident reader signal, and other specialized functions; and an antenna for receiving and transmitting the signal. The tag information may be stored in a non-volatile memory. The RFID tag may include either fixed or programmable logic for processing the transmission and sensor data, respectively.

An RFID reader may transmit an encoded radio signal to interrogate the tag. The RFID tag may receive the message and then respond with its identification and/or other information. This may be only a unique tag serial number, or may be product-related information such as a stock number, lot or batch number, production date, or other specific information. Since tags have individual serial numbers, the RFID system design may discriminate among several tags that might be within the range of the RFID reader and read them.

RFID systems may be classified in two major classes operating in different frequency bands. The difference between the two classes is based on the type of physical coupling between the reader and the tag, which could be either magnetic (inductive coupling) or electromagnetic (radiative coupling). Inductive or magnetic coupling (MC) occurs when a varying magnetic field exists between two parallel conductors typically less than a wavelength apart, inducing a change in voltage along the receiving conductor. It generally applies to frequencies up to the Very High Frequency (VHF) range, around 100 MHz. In RFID systems based on inductive coupling, the tag gets its energy from the proximity coupled magnetic field and responds by loading its own antenna with different impedances. Near Field Communication (NFC) is a specialized subset within the family of RFID technology that uses magnetic field induction to enable communication between devices.

Radiative or electromagnetic coupling occurs when the source and the target are separated by a large distance, typically more than a wavelength. The source and the target act as radio antennas: the source emits or radiates an electromagnetic wave which propagates across the space in between and is picked up or received by the target. Radiative coupling generally applies to frequencies above 100 MHz. In RFID systems based on radiative coupling, the tag gets its energy from the electromagnetic field radiated by the reader and reflects it back modulating with its own impedances presenting different Radar Cross Section (RCS). RCS is a measure of the ability of a target to reflect radar signals in the direction of the radar receiver.

The coupling nature of the first class (inductive coupling) may limit the read range to an order of magnitude of the size of the reader or the tag antenna (generally few centimeters) while the range of the second class (radiative coupling) may reach up to tens of meters depending on the nature of tags (passive and active) and the tag sensitivity. For long range RFID systems operating in the Ultra High Frequency (UHF) band or microwave bands using passive tags, a part of the incoming RF signal (issued from the remote RFID reader and coupled through the tag antenna) is converted to DC for the supply of the chip. Once the chip is activated, the received signal is demodulated by the interface and reflected back (backscattered) modulated by the information stored in the chip memory. The chip activation may be the limiting factor of the achievable range of RFID systems using passive tags. Typical ranges of 10 m are currently achievable in Line of Sight (LOS) conditions with using state of the art passive tags and readers.

The Electronic Product Code (EPC™) Generation 2 (Gen2) air interface protocol defines the physical and logical requirements for an RFID system of interrogators and passive tags, operating in the 860 MHz-960 MHz UHF (or also called 900 MHz) band. Over the past decade, EPC Gen2 has established itself as the standard for UHF implementations across multiple sectors, and is at the heart of more and more RFID implementations.

More recently with the explosion of wireless sensors, a new generation of RFID chips compliant with the EPC Gen2 standard has emerged with a power supply input to be connected to a coin-size battery, increasing the device range to several tens of meters. The new devices are not strictly passive, but may be considered semi-passive devices.

Since they are small and have the ability to be passive or semi-passive, RFID tags are increasingly being considered for low-power electronic device applications. For example, regular remote controls, either based on infrared (IR) or radiofrequency (RF) technology, have traditionally required batteries as a power source. The limited lifetime of the batteries and their maintenance cost in addition to their environmental cost has increased the interest for battery-less or passive remote control devices.

A previous passive remote control based on standard RFID tags uses a regular reader integrated in the device to be controlled (e.g., the TV set) and remote passive RFID chips or tag circuits connected to a single RFID antenna through a multiport microstrip network. Each key is associated with a standard passive RFID chip. By default all the chips are inactive. Once a key is pressed, the corresponding chip is activated and is then identified by the RFID reader. However, there are drawbacks with this approach. First, it requires a large number of chips (one chip per key of the remote control). Second, a multiport microstrip network operating in the UHF frequency band or 2.4 GHz (corresponding to the long range RFID system) is a complex and rather lossy circuit with the loss increasing with the number of keys.

Therefore, there is a need for simple and efficient passive low-power electronic devices. The present disclosure is directed towards a device that addresses some of the drawbacks discussed above.

SUMMARY

According to an aspect of the present disclosure, an apparatus is provided, the apparatus including at least two radio-frequency identification (RFID) tag devices each operable to transmit a signal when activated; and a first switch coupled to the at least two RFID tag device and operable to activate the at least two RFID tag devices when the switch is in a first switch state, said first switch being a first key identified by RFID tag information of the at least two RFID tag devices.

According to an aspect of the present disclosure, a method is provided, the method including activating at least two RFID tag devices by a first switch; and transmitting a signal by each of the at least two RFID tag devices, the at least two RFID tag devices being included in an apparatus, said first switch being a first key identified by RFID tag information of the at least two RFID tag devices.

According to an aspect of the present disclosure, an apparatus is provided including an antenna operable to receive at least two RFID signals from a remote device and a processor configured to detect an RFID tag information for each of the at least two RFID signals, determine a key of the remote device based on the joint RFID tag information for each of the at least two RFID signals and provide the determined key.

According to an aspect of the present disclosure, a method is provided including receiving at least two RFID signals from a remote device, detecting an RFID tag information for each of the at least two RFID signals, determining a key of the remote device based on the joint RFID tag information for each of the at least two RFID signals and providing the determined key.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
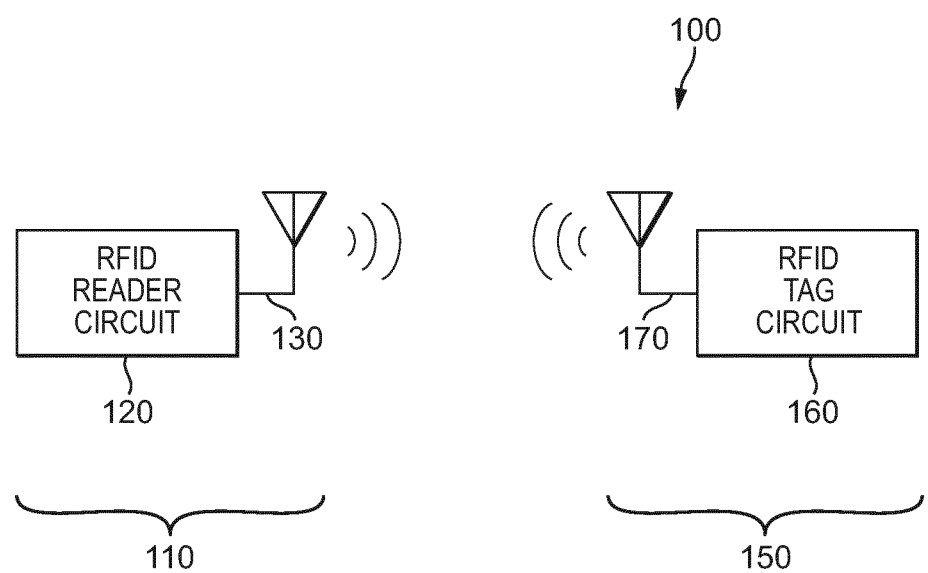
FIG. 1 illustrates a simplified block diagram of an exemplary RFID system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with, through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is directed to passive (or semi-passive) low-power electronic devices using switchable RFID tags for controlling other electronic devices, e.g., remote control, keyboard, etc. The controlled electronic device may be any remotely controllable device/machine/equipment, e.g., any audio/video (A/V) device, box (gateway, set-top), Digital Versatile Disc (DVD) player, home appliance, etc.

Fundamentally, a passive RFID tag acts as an energy harvester. The RF energy harvesting may be performed by an antenna and a rectifier/multiplier tuned to the waves received from the RFID reader. Indeed, a portion of the energy of the incoming RF signal, transmitted by the RFID reader, and coupled through the RFID tag antenna, may be converted to DC by the rectifier/multiplier for the supply of the RFID chip and is thus not used for the wireless communication link.

FIG. 1 illustrates a simplified block diagram of an exemplary RFID system 100 in accordance with an embodiment of the present disclosure. RFID system 100 includes RFID reader device 110 and RFID tag device 150. RFID reader device 110 includes RFID reader circuit 120 coupled to RFID reader antenna 130. RFID tag device 150 includes RFID tag circuit 160 coupled to RFID tag antenna 170. RFID reader 110 generates and modulates a request message in RFID reader circuit 120 to create a transmitter signal, and radiates the transmitter signal via electromagnetic waves through antenna 130. RFID tag antenna 170 is tuned to receive the waves radiated from RFID reader antenna 130. An antenna is a specialized transducer or converter that converts RF fields into Alternating Current (AC) or vice-versa. RFID tag antenna 170 converts electromagnetic fields of the received waves to an electrical signal. RFID tag 150 draws power from the electrical signal and uses it to power up RFID tag circuit 160. The electrical signal may fully power up the RFID tag circuit 160, in a passive RFID tag, or partially power up the RFID tag circuit 160, in the case of a semi-passive RFID tag. RFID tag circuit 160 also receives and demodulates the electrical signal to retrieve the request message. RFID tag circuit 160 then generates and modulates a response message with its identification number(s) and/or other information. The modulated response message is radiated via electromagnetic waves through RFID tag antenna 170.

One of the aspects of passive and semi-passive RFID tags is the method of re-modulating an RFID reader electromagnetic wave through backscattering. Because RFID tags are designed to generally have a reactive (e.g., capacitive) impedance, any incoming electromagnetic wave is actually reflected (re-radiated) by an antenna to its source. Thus, when RFID reader 110 transmits an electromagnetic wave to RFID tag 150, the wave is reflected by the RFID tag 150 back toward the RFID reader 110. Because of this reflective characteristic, RFID tag 150 is able to encode a message by modulating the re-radiated electromagnetic wave. Actual modulation of the wave may occur as a transistor in RFID tag circuit 160 rapidly switches between two discrete impedance states. Because each impedance state may have both a resistive and capacitive characteristic (real and imaginary impedance), the RFID tag 150 may actually perform both phase and amplitude modulation of the re-radiated signal.

RFID reader 110 may receive the re-radiated waves through RFID reader antenna 130 and convert the waves to digital data containing the response message. It is to be understood that RFID reader circuit 120 may be any RFID reader circuit or IC well-known to one of ordinary skill in the pertinent art. Likewise, RFID reader antenna 130 and RFID tag antenna 170 may be any antenna well-known to one of ordinary skill in the pertinent art, e.g., dipole antennas, loop antennas, inverted-F antennas, monopole antennas, patch or microstrip antennas, etc.

Figure 2:
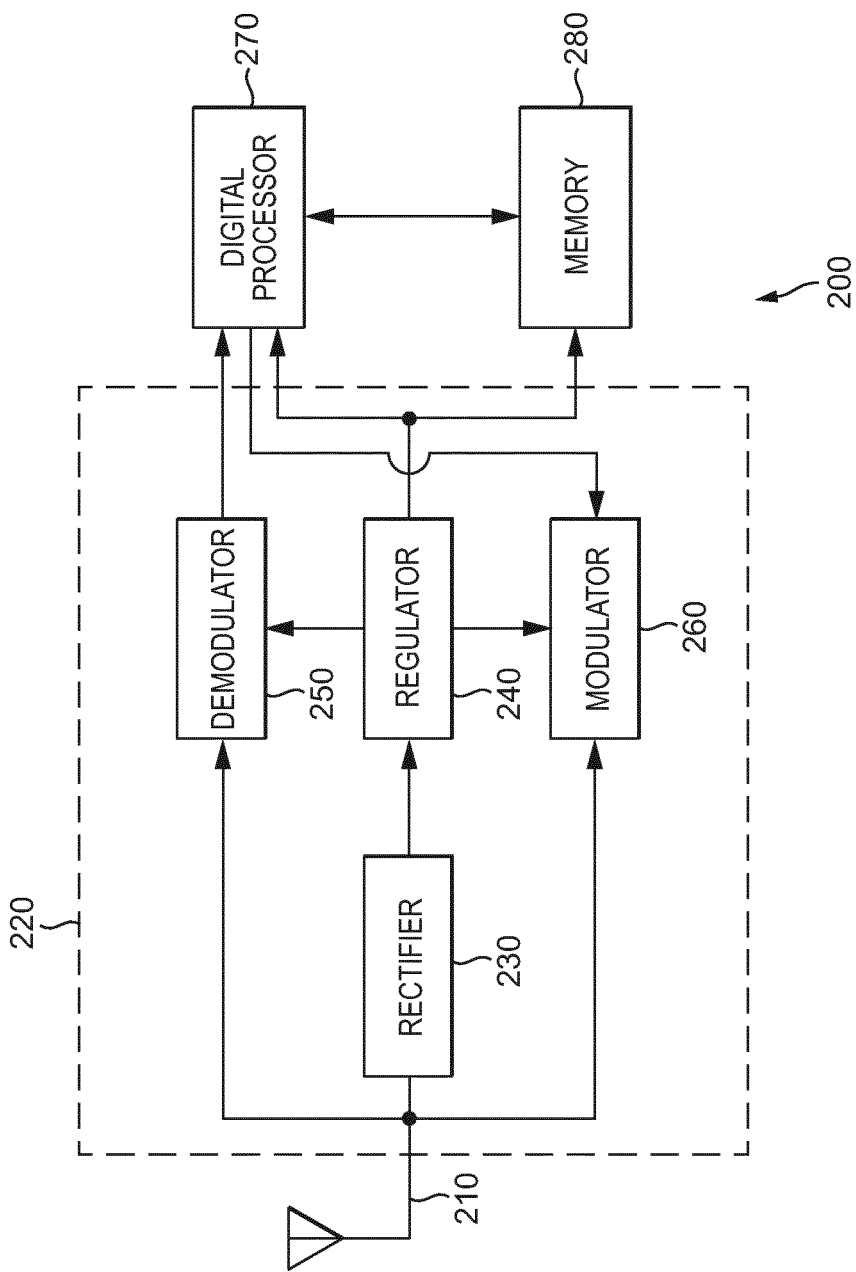
FIG. 2 illustrates a simplified block diagram of an exemplary RFID tag device in accordance with an embodiment of the present disclosure.

FIG. 2 illustrates a simplified block diagram of an exemplary RFID tag device 200 in accordance with an embodiment of the present disclosure. RFID tag 200 may be similar to RFID tag device 150. RFID tag device 200 includes RFID antenna 210, similar to RFID antenna 170. RFID tag device 200 also includes analog front end (AFE) 220, digital processor 270 and memory 280 which together are similar to RFID tag circuit 160. AFE 220 is coupled to antenna 210 and includes rectifier 230, regulator 240, demodulator 250 and modulator 260. Rectifier 230 performs the function of rectification/multiplication of the received electrical signal and provides Direct Current (DC) power to regulator 240. An RF energy harvester is built around an RF rectifier which is an electrical circuit that converts RF power from a lower voltage to a higher DC voltage using a network of capacitors and diodes. The antenna input is connected to a diode rectifier through a matching network and for given diode characteristics and fixed RF input power, the load is optimized for a maximum RF to DC converter efficiency. As an example, the HSMS-286 family of RF detector diodes from Avago™ is well suited for use in energy harvesting from 900 MHz up to 5.8 GHz frequency range.

Regulator 240 is coupled to rectifier 230 and regulates the input power to desired levels by the remaining components of RFID tag 200, which are coupled to regulator 240. Demodulator 250 is coupled to regulator 240 and to antenna 210 and receives and demodulates the input electrical signal to retrieve the request message and possibly control signals from the RFID reader (e.g., RFID reader 110). Modulator 260 is coupled to regulator 240 and to antenna 210, and modulates a response message including its identification number(s) and/or other information, and possibly control signals. The modulated response message is radiated via electromagnetic waves through RFID tag antenna 210.

Digital processor 270 is coupled to regulator 240, demodulator 250 and modulator 260. Digital processor 270 receives and interprets a digital request message and control signals from demodulator 250 and requests identification number(s) and/or other information from memory 280. Memory 280 is coupled to digital processor 270 and stores identification number(s) and/or other information. Memory 280 may be a non-volatile memory, including a read-only memory (ROM) or a read-write memory. Memory 280 provides the necessary information to digital processor 270 upon request. Digital processor 270 may also include the operations of clock management, data encoding (e.g., error correction encoding), data decoding (e.g., error correction decoding), data encryption, data decryption, anti-collusion, etc. Digital processor 270 may include a digital logic circuit, including, e.g., finite state machine(s) (FSM) and registers. Digital processor 270 may include a controller or processor that controls the operation of RFID tag 200. Digital processor 270 may also generate appropriate control signals and send the response message including identification number(s) and/or other information and possibly control signals to modulator 260.

It is to be understood that the various components of RFID tag 200 may be well-known circuits by a person of ordinary skill in the art and will not be described in detail. It is to be understood that other well-known components may be present in RFID tag 200, e.g., a frequency oscillator. It is to be understood that RFID tag 200 and corresponding RFID reader (e.g., RFID reader 110) may be compliant with at least one RFID standard, e.g., the EPC Gen2, the International Standards Organization ISO 18000 series standards, etc.

According to one or more embodiments of the present disclosure, more than one rectifier/multiplier circuits or RF harvester may be included in RFID tag device 200, the plurality of rectifiers/multipliers harvesting energy from a plurality of frequency bands.

Embodiments of the present disclosure may use long range passive (or semi-passive) RFID tags operating in the UHF or future higher frequency bands. Without loss of generality, the following discussion will concentrate on remote control devices based on RFID tags, but the discussion equally applies to other passive or semi-passive devices, e.g., passive or semi-passive keyboards.

Figure 3:
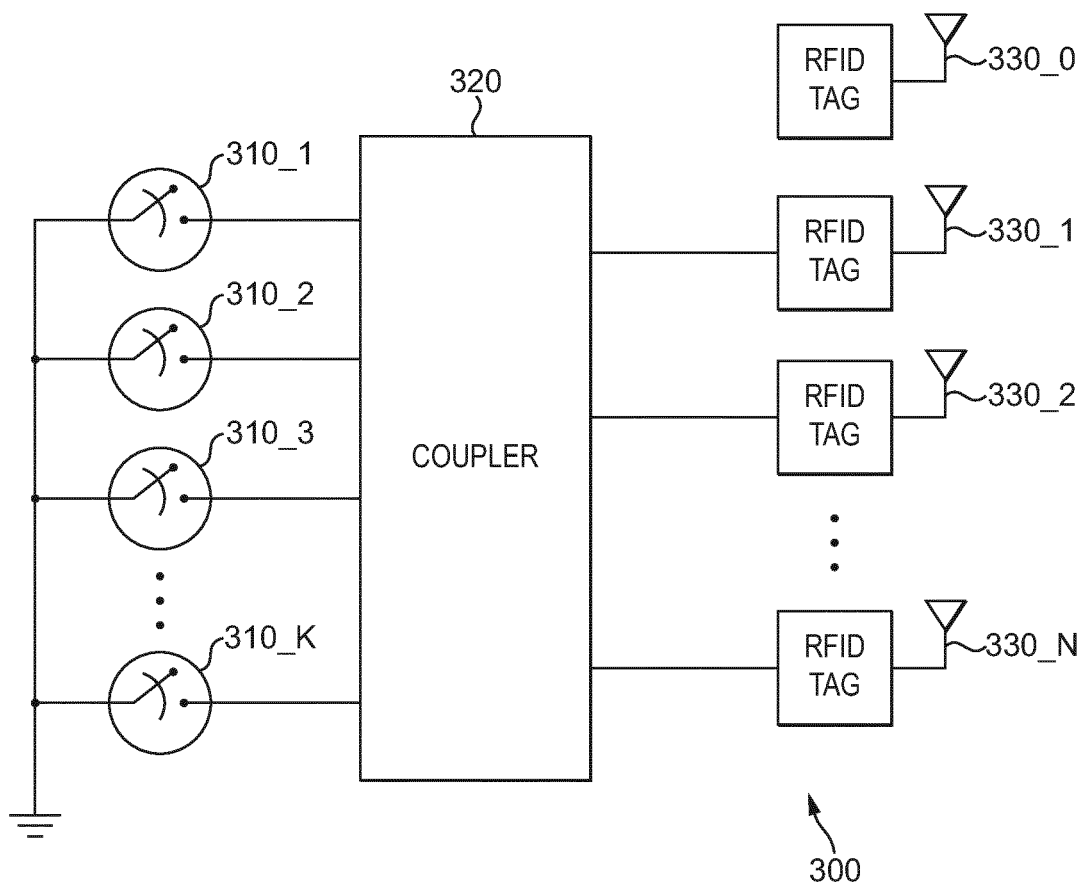
FIG. 3 illustrates a simplified block diagram of an exemplary passive remote control device in accordance with an embodiment of the present disclosure.

FIG. 3 illustrates a simplified block diagram of an exemplary passive (or semi-passive) remote control device 300 in accordance with an embodiment of the present disclosure. Remote control device 300 includes a plurality of switches (or keys, or buttons) 310_1, 310_2, . . . , 310_K, a coupler 320 and a plurality of RFID tags 330_1, 320_2, . . . , 330_N. RFID tags 330_1, 320_2, . . . , 330_N may be similar to RFID tag 150 and RFID tag 200. RFID tags 330_1, 330_2, . . . , 330_N may be passive or semi-passive RFID tags. Switches 310_1, 310_2, . . . , 310_K may be hardware, mechanical or software switches. Each switch 310_1, 310_2, . . . , 310_K is coupled to the coupler 330. Coupler 320 is coupled to each RFID tag 330_1, 330_2, . . . , 330_N. Coupler 320 couples switches 310_1, 310_2, . . . , 310_K to their respective RFID tags 330_1, 330_2, . . . , 330_N, such that at least one switch is coupled to more than one RFID tag. In general, some but not all switches may be coupled to only one RFID tag, some switches may be coupled to only two RFID tags, some switches may be coupled to only three RFID tags, and so on, up to the number K of switches. Coupler 320 may be implemented by a hardware circuit (e.g., wire connections), a mechanical connection or a programmable processor.

In remote control device 300, when a switch (e.g., switch 310_1) is in a first state, the respective RFID tags coupled to the switch (e.g., 330_1 and 330_2) are activated. In the active state, each RFID tag may communicate with the RFID reader (e.g., RFID reader 110). While communicating with the RFID reader, each RFID tag may receive a signal from the RFID reader and transmit a signal to the RFID reader including tag information stored in a memory of each RFID tag. On the other hand, when the switch (e.g., 310_1) is in a second state, the respective RFID tags (e.g., 330_1 and 330_2) are inactivated (provided that no other switch activates the RFID tags). In the inactive state, each RFID tag may not communicate with the RFID reader. Similarly, when a switch is activated, any RFID tags not connected to the switch may not be activated by the switch.

In one embodiment of the present invention, the activation of the RFID tags by a switch coupled to the RFID tags may be performed substantially at the same time. Substantially or approximately the same time may imply the time of activation of each RFID tag by the switch within a 1% margin of the actual time value. For example, it may imply a small time delay amount between the activations of any two RFID tags coupled to the switch. The time delay may be, e.g., 1 millisecond. In one embodiment, the activations of the RFID tags may also be staggered in time, including time division multiplexing, where each RFID tag is activated during different periods of time T. The period of time T may be, e.g., 100 milliseconds. In yet another embodiment, the activation of the RFID tags may include frequency division multiplexing, where each RFID tag transmits in a different frequency band, i.e., using a different frequency carrier.

In one embodiment, the activation/deactivation of the RFID tag by the switch may happen by respectively a Short Circuit (SC) or an Open Circuit (OC) at the RFID antenna input, thus ensuring the RFID antenna coupling (activation) or decoupling (deactivation) to the RFID chip or tag circuit, respectively, and allowing communication or not with the RFID reader device, respectively. The switch may be placed between ground and the RFID antenna input, such that the distance between ground and the RFID antenna input may be substantially equal to $\lambda/4$, where $\lambda$ is the wavelength of the resonant frequency of the antenna. Substantially equal may imply a value within 10% deviation or margin from the actual value.

The device controlled by remote control device 300 may be any remotely controllable electronic device/machine/equipment, e.g., television, set-top box, gateway, DVD player, home appliance, etc.

The RFID reader may be included in the device controlled by remote control device 300 or coupled to the controlled device. The RFID reader 110 performs the inverse operations of the various RFID tags 150, 200 and may include similar components to the RFID tag 120, 200: rectifier, regulator, modulator, demodulator, digital processor and memory, included in the RFID reader circuit 120, and an RFID reader antenna 130. The digital processor may include a controller or processor that controls the operation of RFID reader 110.

The RFID reader 110 may receive the signal from each RFID tag through RFID reader antenna 130, and demodulate and retrieve the tag information from each RFID tag on the RFID reader circuit 120, e.g., by the demodulator and digital processor, respectively. The tag information from the RFID tags (e.g., 330_1 and 330_2) associated with a switch (e.g., 310_1) jointly represent the switch command, instruction or partial command/instruction. Hence, when a switch is activated, the tag information from each RFID tag associated with the switch jointly may identify a command or portion of a command that instructs the device controlled by passive remote control device 300 to, e.g., display program guide, open a menu, change channel, start, stop, pause, fast forward, rewind, etc.

Note that with many RFID standards, timing information between transmit and receive exchange of information is defined by strict guidelines. In fact, a sort of "handshaking" is required between the tag and reader to complete an interrogation round. It is to be understood that various components of RFID reader 110 may be well-known circuits by a person of ordinary skill in the art and will not be described in detail. It is to be understood that other well-known components may be present in RFID reader 110, e.g., a frequency oscillator. It is to be understood that RFID reader 110 may be compliant with at least one RFID standard, e.g., the EPC Gen2, the International Standards Organization ISO 18000 series standards, etc.

For switches 310_1, 310_2, . . . , 310_K, a first, active or "ON" state may be represented, for example, by a value of '1', and a second, inactive or "OFF" state may be represented by a value of '0', or the opposite values ('0' and '1', respectively). Similarly, a first, active or "ON" state may be represented, for example, by a voltage level $V_{cc}>0$ Volts, and a second, inactive or "OFF" state may be represented by a voltage level of 0 Volts or connection to ground, or the opposite values (ground and $V_{CC}$, respectively). Moreover, a first, active or "ON" state may be represented, for example, by a connection or coupling between the RFID tag circuit (e.g., 160) and the RFID tag antenna (e.g., 170), and a second, inactive or "OFF" state may be represented by an absence of connection or coupling between the RFID tag circuit and the RFID tag antenna. The coupling may be established by, e.g., the antenna input being grounded by the activation of the switch.

Switches 310_1, 310_2, . . . , 310_K may be a button, a key, a mechanical switch or a software switch. The status ("ON" or "OFF") of the N RFID tags corresponding to each switch or key may be monitored either by a mechanical system or electronically. In the case of electronic monitoring, the required energy may be harvested from the mechanical strain energy, for example, by using a piezoelectric harvesting button. Piezoelectricity is the electric charge that accumulates in certain solid materials (such as crystals, certain ceramics, and biological matter such as bone, DNA and various proteins) in response to applied mechanical stress.

Remote control device 300 may additionally include a supplementary RFID tag 330_0 which may serve to identify the remote control device 300 and/or to serve as a reference, for example, for determining the readability range, signal level and/or performance of the passive RFID tags by the RFID reader associated with the device to be controlled. Supplementary RFID tag 330_0 may be always active or ON, i.e., communicating with the RFID reader. Supplementary RFID tag 330_0 may also be inactivated with an additional switch (not shown in FIG. 3). Supplementary RFID tag 330_0 may be optional and may be bypassed or removed.

According to an embodiment of the present disclosure, the RFID reader (e.g., 110) receives the signals from the RFID tags coupled to a switch, detects the tag information from each RFID signal, determines the key or switch based on the (combination of the) detected tag information from each RFID tag coupled to the switch, and provides the determined switch or key to the device to be controlled. The RFID reader device (e.g., 110) performs the inverse operations of RFID tag device (e.g., 120). The operation of receiving the signals may be performed, e.g., by RFID antenna 130. The operations of detecting, determining and providing may be performed, e.g., by RFID reader circuit 120. The RFID reader device may receive each signal via one or more antennas. The signals may be transmitted and received via time division multiplexing or frequency division multiplexing. The RFID reader may be included or coupled to the device to be controlled by remote control device 300, e.g., television, set-top box, gateway, DVD player, home appliance, etc.

Figure 4:
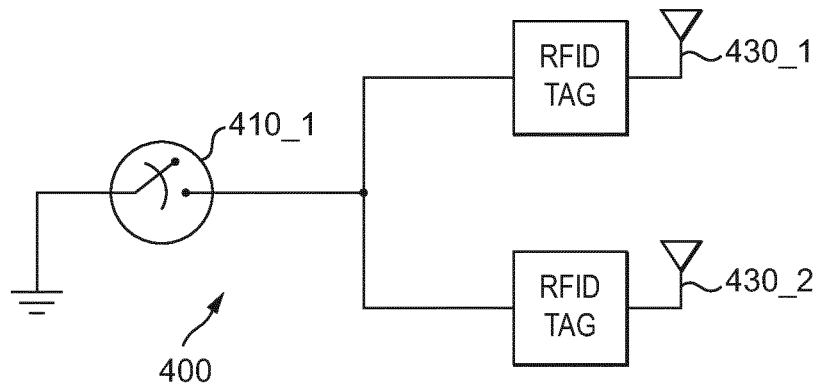
FIG. 4 illustrates a simplified block diagram of an exemplary passive remote control device in accordance with an embodiment of the present disclosure.

FIG. 4 illustrates a simplified block diagram of an exemplary remote control device 400 in accordance with an embodiment of the present disclosure. Remote control device 400 is similar to remote control device 300. In remote control device 400, K=1, N=2, K being the number of switches and N being the number of RFID tags, and switch 410_1 is coupled to RFID tags 430_1 and 430_2. As a result, when switch 410_1 is in a first state, RFID tags 430_1 and 430_2 are activated. In the active state, each RFID tag 430_1 and 430_2 communicates with the RFID reader (e.g., RFID reader 110) associated with the device to be controlled by remote control device 400. Each RFID tag receives a signal from the RFID reader and transmits a signal to the RFID reader including tag information stored in a memory of each RFID tag. The RFID reader receives the signal from each RFID tag, and demodulates and retrieves the tag information from each RFID tag. The tag information of RFID tags 430_1 and 430_2 together represent the switch 410_1. On the other hand, when switch 410_1 is in a second state, RFID tags 430_1 and 430_2 are inactivated. In the inactive state, RFID tag 430_1 and 430_2 do not communicate with the RFID reader.

It is to be understood that, in remote control 400, the direct wire connections between switch 410_1 and RFID tags 430_1 and 430_2 are equivalent to coupler 320.

Figure 5:
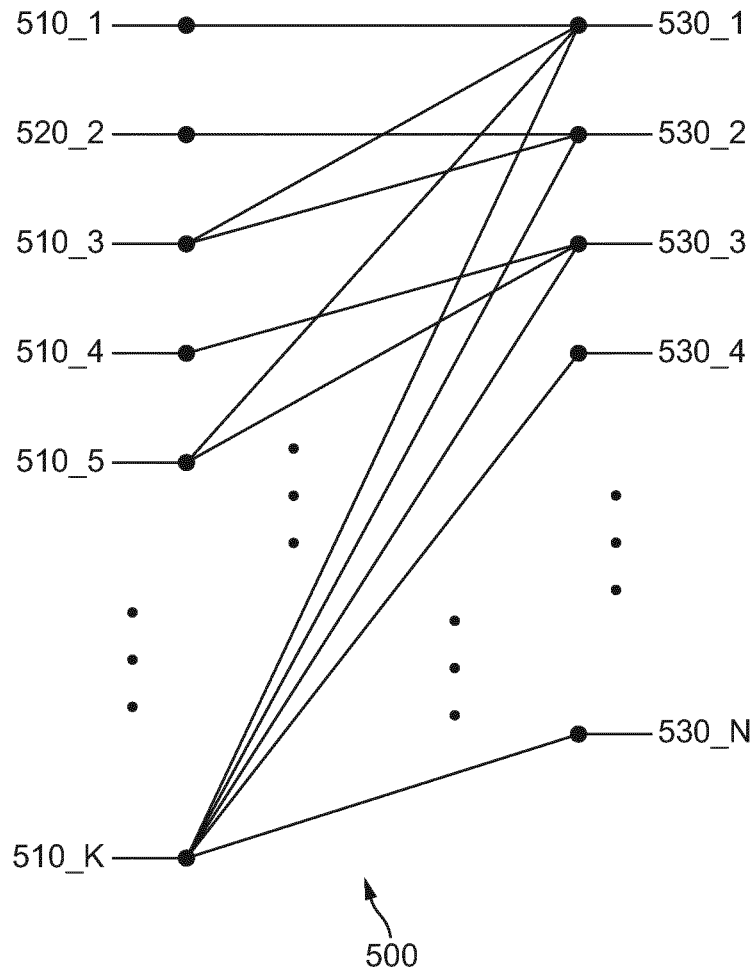
FIG. 5 illustrates a simplified block diagram of an exemplary coupler in accordance with an embodiment of the present disclosure.

FIG. 5 illustrates a simplified block diagram of an exemplary coupler 500 in accordance with an embodiment of the present disclosure. Coupler 500 is similar to coupler 320 and performs coupling between inputs 510_1, 510_2, . . . , 510_K and outputs 530_1, 530_2, . . . , 530_N. Inputs 510_1, 510_2, . . . , 510_K correspond to and are coupled to switches similar to switches 310_1, 310_2, . . . , 310_K. Outputs 530_1, 530_2, . . . , 530_N correspond to and are coupled to RFID tags similar to RFID tags 330_1, 330_2, . . . , 330_N. According to coupler 500, the switch coupled to input 510_1 is connected to the RFID tag coupled to output 530_1. The switch coupled to input 510_2 is only connected to the RFID tag coupled to output 530_2. The switch coupled to input 510_3 is connected to the RFID tags coupled to outputs 530_1 and 530_2. The switch coupled to input 510_4 is only connected to the RFID tag coupled to output 530_3, and so on. Finally, the switch coupled to input 510_K is connected to the RFID tags coupled to all outputs, 530_1, 530_2, . . . , 530_N.

For a value of $K=2^N-1$, one may observe that each output index n=1, 2, . . . N ordered from highest to lowest number, may correspond to one bit in the binary representation of the value of the input index k=1, 2, . . . K, when the following rule is applied: the output index n is set equal to 1 when there is a connection to the input index k and to 0 when there is no connection to input index k. For example, input 510_2 (k=2) is connected to output 530_2 (n=2), For all the remaining values of n (1, 3, . . . , N), there is no connection to input 510_2. Hence, the binary representation of the outputs is given by "00 . . . 0010". In another example, input 510_5 is connected to outputs 530_1 and 530_3, representing the number "00 . . . 0101". Observe that the binary number "000 . . . 0" does not represent a switch, since it is associated with no coupling to any RFID tag.

Coupler 500 illustrates an embodiment of a remote control device according to the present disclosure having K switches and only utilizing N RFID tag devices, where $N=\log_2(K+1)$. For example, with N=5, the remote may support 31 switches, keys or buttons. Hence, an embodiment of the present disclosure may contain more switches than the number of RFID tag devices. In one embodiment of the present disclosure, the number of switches may be an exponential factor of the number of RFID tags. In one embodiment of the present disclosure, the number of switches may be a function of two elevated to the power of the number of RFID tags. Therefore, according to the present disclosure, a remote control device does not need the same number of RFID tag devices as the number of switches, representing savings in complexity.

For $N=\log_2(K+1)$, each switch or key may be connected to M RFID tags (M=1, 2, . . . N). The number of switches per value of M may be:

M=1: the switch is coded with 1 activated RFID tag (total N switches)

M=2: the switch is coded with 2 activated RFID tags (total N!/(N−2)!2!)

Etc.

M=N: the switch is coded with all RFID tags activated (total one switch)

For an embodiment of the present disclosure including a supplementary RFID tag, the number of RFID tags may be $N'=\log_2(K+1)+1$. In one embodiment, the number of supplementary RFID tags may be more than one.

It is to be understood that the various individual components of systems 300, 400 and 500 may be well-known circuits or mechanical components by a person of ordinary skill in the pertinent art and will not be described in detail. In particular, the RFID tag devices may be standard RFID tag devices readily available on the market, e.g., EPC Gen2 RFID devices. The RFID tag devices may also include Near-Field Communication (NFC) devices.

It is to be understood that the examples described in FIGS. 1 to 5 are not exhaustive and other arrangements may be chosen without departing from the scope of the present disclosure.

According to one embodiment of the present disclosure, an apparatus for passive remote control 300, 400 is provided including at least two radio-frequency identification (RFID) tag devices 330_1, 330_2, . . . 330_N, 430_1, 430_2 each operable to transmit a signal when activated; and a first switch 310_1, 310_2, . . . , 310_K, 410_1 coupled to the at least two RFID tag devices and operable to activate the at least two RFID tag devices when the first switch is in a first switch state. The first switch may be a first key jointly identified by RFID tag information of the at least two RFID tag devices. The at least two RFID tag devices may be deactivated when the first switch is in a second switch state. The at least two RFID tag devices may each transmit a signal to an RFID reader device. The transmitted signal from each of the at least two RFID tags may include tag information stored in a memory of the at least two RFID tags. The tag information from each of the at least two RFID tag devices jointly identify the switch that activated them. The tag information from each of the at least two RFID tag devices may jointly represent one instruction or a portion of an instruction. Each signal from each of the at least two RFID tag devices may be received by an RFID reader operable to detect the tag information from each signal and to provide the instruction or portion of the instruction to the device controlled by the apparatus. For example, the tag information may be the tag identification number of an RFID tag device. The RFID reader may include a table with the various combinations of tag information, and which switch each combination of tag information may represent. The device controlled by the apparatus may include the RFID reader.

In one embodiment of the apparatus, the signal from each of the at least two RFID tag devices may include RFID tag information, and the RFID tag information from each of the at least two RFID tag devices jointly identify the first switch. For example, if the switch 310_1 is coupled to RFID tag 330_1 and 330_2, then the tag information from 330_1 and the tag information from 330_2 when detected at the RFID reader device (e.g., 110), will jointly identify switch 310_1 as having been pressed or activated.

In one embodiment, the apparatus may further include at least one second switch 310_1, 310_2, . . . , 310_K, each at least one second switch coupled to at least one RFID tag device 330_1, 330_2, . . . 330_N, the at least one RFID tag device being selected from the at least two RFID tag devices. The at least one second switch may operate similarly to the first switch, having a first state and a second state of operation.

In one embodiment, the apparatus may further include at least one additional RFID tag device 330_1, 330_2, . . . 330_N and at least one second switch 310_1, 310_2, . . . , 310_K, each additional switch coupled to at least one other RFID tag device, the at least one other RFID tag device being selected from the plurality of RFID tag devices including the at least two RFID tag devices and the at least one additional RFID tag device. The at least one third switch may operate similarly to the first and the at least one second switch, having a first state and a second state of operation.

In one embodiment, the apparatus may further include a supplementary RFID tag 330_0 operable to be used for power or performance control. The supplementary RFID tag may not be coupled to a switch. The supplementary RFID tag may be optional, bypassed or removed.

In one embodiment of the apparatus, a switch 310_1, 310_2, . . . , 310_K may activate an RFID tag device 150, 330_1, 330_2, . . . , 310_N by coupling an RFID tag circuit 160 included in the RFID tag device to an RFID antenna 170 included in the RFID tag device. The switch 310_1, 310_2, . . . , 310_K may deactivate the RFID tag device 150, 330_1, 330_2, . . . , 310_N by decoupling the RFID tag circuit 160 from the RFID antenna 170. The activation/deactivation may happen by respectively a Short Circuit (SC) or an Open Circuit (OC) at the RFID antenna input, thus ensuring the RFID antenna coupling (activation) or decoupling (deactivation) to the RFID chip or tag circuit allowing its reading or not by the RFID reader device.

In one embodiment of the apparatus, a number of switches may be greater than a number of RFID tag devices. In this case, K>N.

In one embodiment of the apparatus, a number of switches may be a function of two raised to the power of a number of RFID tag devices.

In one embodiment of the apparatus, a number of switches may be less than two raised to the power of a number of RFID tag devices.

In one embodiment of the apparatus, a number of switches plus one may be equal to two raised to the power of a number of RFID tag devices. In this case, $K=2^N-1$.

In one embodiment of the apparatus, a number of switches plus one may be equal to two raised to the power of a number of RFID tag devices minus one. In this case, $K=2^{N-1}-1$, where one RFID tag device accounts for a supplementary RFID tag device not connected to a switch.

In one embodiment of the apparatus, a switch 310_1, 310_2, . . . , 310_K may be represented by a binary number wherein each digit corresponds to an RFID tag device and is one of a first tag state and a second tag state, the first tag state indicating that the switch is coupled to the RFID tag device associated with the digit and the second tag state indicating that the switch is not coupled to the RFID tag device associated with the digit.

In one embodiment of the apparatus, the at least two RFID tag devices and the at least one additional RFID tag device 330_1, 330_2, . . . , 330_N may be one of a passive and a semi-passive RFID tag device. In one embodiment, the supplementary tag device 330_0 may be one of a passive and a semi-passive RFID tag device.

In one embodiment of the apparatus, only one RFID tag may transmit a signal at a time. Time division multiplexing may be used, where each RFID tag is activated during different periods of time.

In one embodiment of the apparatus, each RFID tag may transmit using a separate RF frequency band.

In one embodiment of the apparatus, the apparatus 300 may be a remote control.

In one embodiment of the apparatus, the apparatus 300 may be a keyboard.

Figure 6:
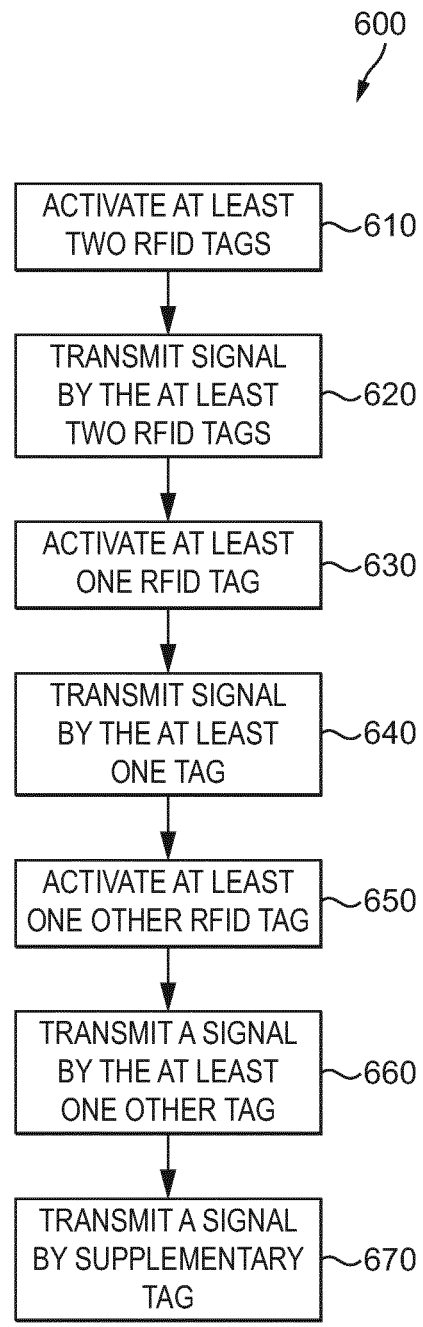
FIG. 6 illustrates a flowchart of an exemplary method in accordance with an embodiment of the present disclosure.

FIG. 6 illustrates a flowchart of an exemplary method of passive remote control in accordance with the present disclosure. The method may include, at step 610, activating at least two RFID tag devices by a first switch. The at least two RFID tag devices may be jointly activated by the first switch (e.g., at substantially the same time). The step 610 may be performed by, for example, switch 310_1, 310_2, . . . , 310_K, 410_1. The at least two RFID tag devices may be, for example, RFID tag devices 330_1, 330_2, . . . , 330_N, 430_1, 430_2 The first switch may be a hardware switch circuit, a mechanical switch or a software switch.

Finally, at step 620, the method may include transmitting a signal by each of the at least two RFID tag devices, the at least two RFID tag devices included in an apparatus. The first switch may be a first key jointly identified by RFID tag information of the at least two RFID tag devices. The step 620 may be performed by, for example, RFID tag devices 330_1, 330_2, . . . , 330_N, 430_1, 430_2. The apparatus may be, for example, apparatus 300 or 400. The transmitted signal from each of the at least two RFID tags may include tag information stored in a memory of the at least two RFID tags. The tag information from each of the at least two RFID tag devices jointly identify the switch that activated them. The tag information from each of the at least two RFID tag devices may jointly represent one instruction or a portion of an instruction. Each signal from each of the at least two RFID tag devices may be received by an RFID reader operable to detect the tag information from each signal and to provide the instruction or portion of the instruction to the device controlled by the apparatus. For example, the tag information may be the tag identification number of an RFID tag device. The RFID reader may include a table with the various combinations of tag information, and which key or switch each combination of tag information may represent. The device controlled by the apparatus may include the RFID reader.

In one embodiment of the method, the signal from each of the at least two RFID tag devices may include RFID tag information, and the RFID tag information from each of the at least two RFID tag devices may jointly identify the first switch. For example, if the switch 310_1 is coupled to RFID tag 330_1 and 330_2, then the tag information from 330_1 and the tag information from 330_2 when detected at the RFID reader device (e.g., 110), will jointly identify switch 310_1 as having been pressed or activated. Also, since switch 410_1 is coupled to RFID tag 430_1 and 430_2, then the tag information from 430_1 and the tag information from 430_2 when detected at the RFID reader device (e.g., 110), will jointly identify switch 410_1 as having been pressed or activated.

In one embodiment, the method may further include, at step 630, activating at least one RFID tag device by at least one second switch, the at least one RFID tag device being selected from the group including the at least two RFID tag devices, the at least one second switch being included in the apparatus, and, at step 640, transmitting a signal by each of the at least one RFID tag device. The step 630 may be performed by, for example, switch 310_1, 310_2, . . . , 310_K. The step 640 may be performed by, for example, RFID tag devices 330_1, 330_2, . . . , 330_N. The at least one second switch may operate similarly to the first switch, having a first state and a second state of operation. The steps 630 and 640 may be optional, bypassed or removed.

In one embodiment, the method may further include, at step 650, activating at least one other RFID tag device by at least one third switch, the at least one other RFID tag device being selected from the plurality of RFID tag devices including the at least two RFID tag devices and at least one additional RFID tag device, the at least one additional RFID tag device and the at least one third switch being included in the apparatus, and, at step 660, transmitting a signal by the at least one other RFID tag device. The step 650 may be performed by, for example, switch 310_1, 310_2, . . . , 310_K. The step 660 may be performed by, for example, RFID tag devices 330_1, 330_2, . . . , 330_N. The at least one third switch may operate similarly to the first switch and the at least one second switch, having a first state and a second state of operation. The steps 650 and 660 may be optional, bypassed or removed.

In one embodiment, the method may further include, at step 670, transmitting a signal by a supplementary RFID tag device, the signal being used for power or performance control. The supplementary RFID tag device may not be coupled to a switch. The step 670 may be performed by, for example, supplemental RFID tag device 330_0. The step 670 may be optional, bypassed or removed.

In one embodiment of the method, a switch (e.g., 310_1, 310_2, ..., 310_K) may activate an RFID tag device (e.g., 150, 330_1, 330_2, ..., 310_N) by coupling an RFID tag circuit (e.g., 160) included in the RFID tag device to an RFID antenna (e.g., 170) included in the RFID tag device. The switch 310_1, 310_2, ..., 310_K may deactivate the RFID tag device 150, 330_1, 330_2, ..., 310_N by decoupling the RFID tag circuit 160 from the RFID antenna 170. The activation/deactivation may happen by respectively a Short Circuit (SC) or an Open Circuit (OC) at the RFID antenna input, thus ensuring the RFID antenna coupling (activation) or decoupling (deactivation) to the RFID chip or tag circuit allowing its reading or not by the RFID reader device.

In one embodiment of the method, an RFID tag device (e.g., 150, 330_1, 330_2, ..., 330_N) may be activated by coupling an RFID tag circuit (e.g., 160) to an RFID antenna (e.g., 170) included in the RFID tag device.

In one embodiment of the method, the steps of activating may further include, coupling an RFID tag device circuit (e.g., 160) to an RFID antenna (e.g., 170) included in an RFID tag device (e.g., 150, 330_1, 330_2, ..., 330_N).

In one embodiment of the method, a number of switches may be greater than a number of RFID tag devices. In this case, K>N.

In one embodiment of the method, a number of switches may be a function of two raised to the power of a number of RFID tag devices.

In one embodiment of the method, a number of switches may be less than two raised to the power of a number of RFID tag devices.

In one embodiment of the method, a number of switches plus one may be equal to two raised to the power of a number of RFID tag devices. In this case, $K=2^N-1$.

In one embodiment of the method, a number of switches plus one may be equal to two raised to the power of a number of RFID tag devices minus one. In this case, $K=2^{N-1}-1$, where one RFID tag device accounts for a supplementary RFID tag device not connected to a switch.

In one embodiment of the method, a switch (e.g., 310_1, 310_2, ..., 310_K) may be represented by a binary number wherein each digit corresponds to an RFID tag device (e.g., 330_1, 330_2, ..., 330_N) and is one of a first tag state and a second tag state, the first tag state indicating that the switch is coupled to the RFID tag device associated with the digit and the second tag state indicating that the switch is not coupled to the RFID tag device associated with the digit.

In one embodiment of the method, the at least two RFID tag devices and at least one additional RFID tag device (e.g., 330_1, 330_2, ..., 330_N) may be one of a passive and a semi-passive RFID tag device. In one embodiment, the supplementary tag device (e.g., 330_0) may be one of a passive and a semi-passive RFID tag device.

In one embodiment of the method, only one RFID tag may transmit a signal at a time. Time division multiplexing may be used, where each RFID tag is activated during a different period of time.

In one embodiment of the method, each RFID tag may transmit using a separate RF frequency band.

In one embodiment of the method, the apparatus (e.g., 300) may be a remote control.

In one embodiment of the method, the apparatus (e.g., 300) may be a keyboard.

According to an embodiment of the present disclosure, an apparatus 110 for receiving Radio Frequency Identification (RFID) signals from a remote device is provided including an RFID antenna 130 operable to receive at least two RFID signals, and a processor (within RFID reader circuit 120) operable or configured to detect an RFID tag information for each of the at least two RFID signals, determine a key or switch, or button of the remote device based on the joint RFID tag information for each of the at least two RFID signals and provide the determined key to a device to be controlled. The processor may further demodulate the at least two RFID signals. The RFID reader device 110 performs the inverse operations of RFID tag device 120, 300, 400. The RFID reader device may receive each signal via one or more antennas. The at least two RFID signals may be received from, e.g., apparatus 300 or 400. The RFID reader 110 may be included in the apparatus to be controlled, e.g., television, set-top box, gateway, DVD player, home appliance, etc. The determined key may be, e.g., a remote control key or a keyboard key, and may represent a command or at least a portion of a command sent to the apparatus to be controlled. The determined key may be provided to the apparatus to be controlled including the RFID reader or coupled to the RFID reader. The apparatus to be controlled may perform an operation based on the determined key. The operation may be, e.g., display program guide, open a menu, change channel, start, stop, pause, fast forward, rewind, etc.

In one embodiment of the apparatus, the at least two RFID signals may be received (and transmitted) through time division multiplexing or frequency division multiplexing.

In one embodiment of the apparatus, a supplementary RFID signal may be further received and detected from a supplementary RFID tag device, said supplementary RFID signal being used for power or performance control. Reception of a supplementary RFID signal is optional and may be bypassed or removed. The supplementary RFID signal may be received by the RFID antenna 130 and detected by the processor (within RFID reader circuit 120). The supplementary RFID tag device may be, e.g., RFID tag device 330_0.

In one embodiment of the apparatus, additional at least one RFID signal may be further received from at least one RFID tag device. The at least one RFID tag device may be included in, e.g., apparatus 300 or 400. The processor is then configured to detect an RFID tag information for each of the at least one RFID signal, determine a key or switch based on the RFID tag information for each of the at least one RFID signals and provide the determined key to the device to be controlled.

In one embodiment of the apparatus, the remote device may be a remote control device.

In one embodiment of the apparatus, the remote device may be a keyboard device.

It is to be understood that any of the embodiments of the apparatus for receiving RFID signals may also apply for an apparatus or device to be controlled for receiving RFID signals, when RFID reader device 110 is included in the apparatus or device to be controlled.

Figure 7:
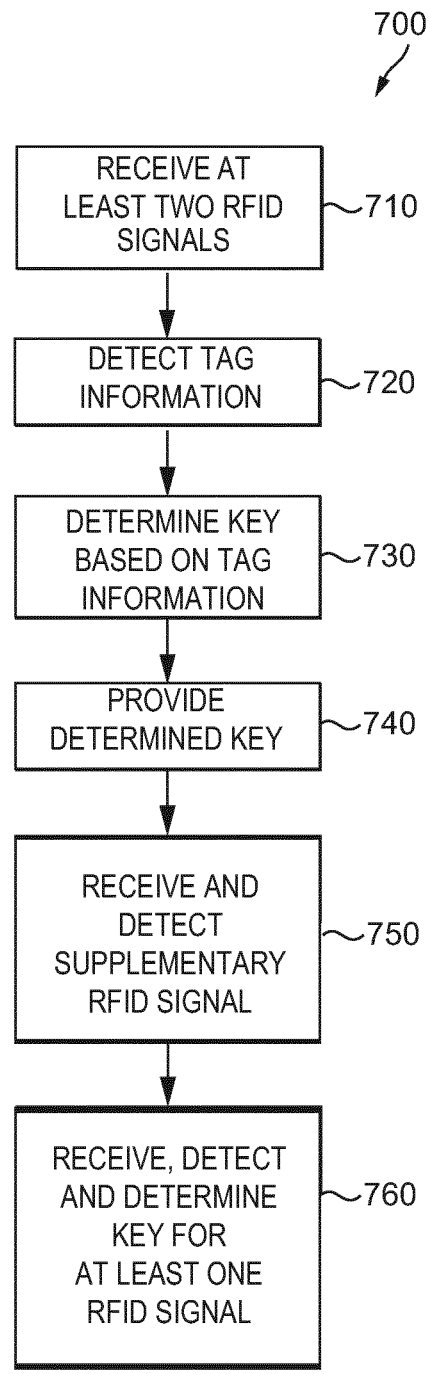
FIG. 7 illustrates a flowchart of an exemplary method in accordance with an embodiment of the present disclosure.

FIG. 7 illustrates a flowchart of an exemplary method of receiving RFID signals in accordance with an embodiment of the present disclosure. The method includes, at step 710, receiving at least two RFID signals from a remote device. Next, at step 720, the method includes detecting an RFID tag information for each of the at least two RFID signals. Then, at step 730, the method includes determining a key or switch, or button of the remote device based on the joint RFID tag information for each of the at least two RFID signals. Finally, at step 740, the method includes providing the determined key to the device to be controlled. The steps of the method may be performed by, e.g., RFID reader 110.

The step of receiving may be performed, e.g., by RFID antenna 130. The steps of detecting 720, determining 730 and providing 740 may be performed, e.g., by RFID reader circuit 120, particularly, the digital processor inside the RFID reader circuit. The step of detecting 730 may further include demodulating the at least two RFID signals. The RFID reader may be included in an apparatus to be controlled, e.g., television, set-top box, gateway, DVD player, home appliance, etc. The determined key may be, e.g., a remote control key or a keyboard key, and may represent a command or at least a portion of a command sent to the apparatus to be controlled. The determined key may be provided to the apparatus to be controlled including the RFID reader or coupled to the RFID reader. The apparatus to be controlled may perform an operation based on the determined key. The operation may be, e.g., display program guide, open a menu, change channel, start, stop, pause, fast forward, rewind, etc. The at least two RFID signals may be received from, e.g., apparatus 300 or 400.

In one embodiment of the method, the signals may be received (and transmitted) through time division multiplexing or frequency division multiplexing.

In one embodiment, the method may further include receiving and detecting, at step 750, a supplementary RFID signal from a supplementary RFID tag device, said supplementary RFID signal being used for power or performance control. The step of receiving and detecting may be performed by, e.g., RFID reader circuit 120. Receiving may be performed, e.g., by RFID antenna 130 and detecting may be performed by the processor within RFID reader circuit 120. The supplementary RFID tag device may be, e.g., RFID tag device 330_0. The step 750 is optional and may be bypassed or removed.

In one embodiment, the method may further include, at step 760, receiving, detecting and determining key for at least one RFID signal from at least one RFID tag device. The step of receiving, detecting and determining key may be performed by, e.g., RFID reader circuit 120. Receiving may be performed, e.g., by RFID antenna 130 and detecting and determining key may be performed by the processor within RFID reader circuit 120. The determined key may then be provided to the device to be controlled. The at least one RFID signal may be received from, e.g., apparatus 300. The at least one RFID tag device may be included in, e.g., apparatus 300 or 400. The step 760 is optional and may be bypassed or removed.

In one embodiment of the method, the remote device may be a remote control device.

In one embodiment of the method, the remote device may be a keyboard device.

It is to be understood that any of the embodiments of the method of receiving RFID signals may also be performed by the apparatus or device to be controlled, when RFID reader device 110 is included in the apparatus or device to be controlled.

It is important to note that one or more of the elements in the process 600 or one one or more of the elements in the process 700 may be combined, performed in a different order, or excluded in some embodiments while still implementing the aspects of the present disclosure.

It is to be appreciated that the various features shown and described in the present disclosure are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. An apparatus comprising:
   at least two radio-frequency identification (RFID) tag devices each operable to transmit a signal when activated; and
   a first switch coupled to the at least two RFID tag devices and operable to activate the at least two RFID tag devices when said first switch is in a first switch state, said first switch being a first key identified by RFID tag information of the at least two RFID tag devices.

2. The apparatus according to claim 1, further comprising at least one second switch each at least one second switch being coupled to at least one RFID tag device, said at least one RFID tag device being selected from the at least two RFID tag devices.

3. The apparatus according to claim 1, further comprising at least one additional RFID tag device and at least one third switch, each at least one third switch coupled to at least one other RFID tag device, said at least one other RFID tag device being selected from the plurality of RFID tag devices including the at least two RFID tag devices and the at least one additional RFID tag device.

4. The apparatus according to claim 3, wherein the at least two RFID tag devices and the at least one additional RFID tag device are one of a passive and a semi-passive RFID tag device.

5. The apparatus according to claim 1, further including a supplementary RFID tag device operable to be used for power or performance control.

6. The apparatus according to claim 1, wherein a switch activates an RFID tag device by coupling an RFID tag circuit included in the RFID tag device to an RFID antenna included in the RFID tag device.

7. The apparatus according to claim 1, wherein a number of switches is a function of two raised to the power of a number of RFID tag devices.

8. The apparatus according to claim 1, wherein the signal from each of the at least two RFID tag devices includes RFID tag information and the RFID tag information from each of the at least two RFID tag devices jointly identify the first switch.

9. A method comprising:
activating at least two RFID tag devices by a first switch; and
transmitting a signal by each of the at least two RFID tag devices, said at least two RFID tag devices being included in an apparatus, said first switch being a first key identified by RFID tag information of the at least two RFID tag devices.

10. The method according to claim 9, further comprising:
activating at least one RFID tag device by at least one second switch, said at least one RFID tag device being selected from the at least two RFID tag devices; and
transmitting a signal by each of said at least one RFID tag device.

11. The method according to claim 9, further comprising:
activating at least one other RFID tag device by at least one third switch, said at least one other RFID tag device being selected from the plurality of RFID tag devices including the at least two RFID tag devices and at least one additional RFID tag device; and
transmitting a signal by each of said at least one other RFID tag device.

12. The method according to claim 11, wherein the at least two RFID tag devices and the at least one additional RFID tag device are one of a passive and a semi-passive RFID tag device.

13. The method according to claim 9, further comprising:
transmitting a signal by a supplementary RFID tag device, said signal being used for power or performance control.

14. The method according to claim 9, wherein a switch activates an RFID tag device by coupling an RFID tag circuit included in the RFID tag device to an RFID antenna included in the RFID tag device.

15. The method according to claim 9, wherein a number of switches is a function of two raised to the power of a number of RFID tag devices.

16. The method according to claim 9, wherein the signal from each of the at least two RFID tag devices includes RFID tag information and the RFID tag information from each of the at least two RFID tag devices jointly identify the first switch.

17. An apparatus comprising:
an antenna operable to receive at least two RFID signals from a remote device; and
a processor configured to detect an RFID tag information for each of the at least two RFID signals, determine a key of the remote device based on the RFID tag information for each of the at least two RFID signals and provide the determined key.

18. The apparatus according to claim 17, wherein a supplementary RFID signal is further received, said supplementary RFID signal being used for power or performance control.

19. A method comprising:
receiving at least two RFID signals from a remote device;
detecting an RFID tag information for each of the at least two RFID signals;
determining a key of the remote device based on the RFID tag information for each of the at least two RFID signals; and
providing the determined key.

20. The method according to claim 19, wherein a supplementary RFID signal is further received, said supplementary RFID signal being used for power or performance control.

* * * * *